3,093,452
PRECIPITATION OF ZIRCONIUM AND FLUORIDE IONS FROM SOLUTIONS
Billie J. Newby, Idaho Falls, Idaho, assignor to the United States of America as represented by the United States Atomic Energy Commission
No Drawing. Filed Sept. 25, 1961, Ser. No. 140,617
7 Claims. (Cl. 23—14.5)

This invention deals with the removal of zirconium ions and fluoride ions from hydrofluoric acid dissolver solutions as they are obtained by the dissolution of uranium-zirconium alloy fuel elements that have been used or are intended to be used in nuclear reactors. This dissolution is either carried out in order to recover the fissionable material not used by the reactor, or else in order to recover the material of defective fuel elements that were found unsuitable for use in a reactor.

The dissolver solutions of the type described above always contain a comparatively large amount of zirconium and small amounts of uranium, so that large volumes of solution per weight unit of uranium have to be processed. It has been found desirable to reduce the volume of these solutions by evaporation, but this was found unfeasible because with increasing concentration zirconium started to precipitate.

It was contemplated to remove the bulk of the zirconium prior to the processing of the dissolver solutions, so that then concentration by evaporation was possible without any precipitation. Such a zirconium separation would also eliminate a greater part of the radioactivity from the solution and thus would make less shielding necessary for further treatment of the solution. Precipitation processes have been investigated by which the zirconium would be obtained in a solid, easily disposable form. Also, it was considered desirable to remove the fluoride anions prior to concentration of the dissolver solution by evaporation, because they are responsible for corrosion of the containers.

For the latter purpose aluminum nitrate has been added prior to the concentration of the dissolver solution, whereby the fluoride anions were complexed, and their corrosive function was eliminated. However, the addition of aluminum nitrate resulted in such a high salt content, that again concentration by evaporation was not possible to a satisfactory degree. Simultaneous precipitation of zirconium and fluoride was investigated by the addition of a water-soluble barium salt and precipitation of a barium fluozirconate; however, this reaction, which proceeds very slowly, required the use of elevated temperature, which again caused corrosion problems.

It is an object of this invention to provide a process for the simultaneous precipitation of zirconium and fluoride ions from aqueous solutions by which both the zirconium and fluoride are removed almost quantitatively.

It is another object of this invention to provide a process for the simultaneous precipitation of zirconium and fluoride ions from aqueous solutions that takes place at a comparatively rapid rate at room temperature.

It is also an object of this invention to provide a process for the simultaneous precipitation of zirconium and fluoride ions from aqueous solutions that, even if carried out at elevated temperature, does not involve any corrosion problems.

It is still another object of this invention to provide a process for the simultaneous precipitation of zirconium and fluoride ions from aqueous solutions by which a practically quantitative separation of zirconium from uranium can be obtained.

It is still another object of this invention to provide a process for the simultaneous precipitation of zirconium and fluoride ions from aqueous solutions which requires a relatively small amount of precipitating agent for quantitative reaction.

It is finally also an object of this invention to provide a process for the simultaneous prepicitation of zirconium and fluoride ions from aqueous solutions by which a supernatant is obtained that contains a comparatively small amount of salt, so that it can be concentrated by evaporation; this in turn provides for a greater capacity of the apparatus for the further processing of the uranium-containing solution, such as an extraction column.

It has been found that sodium formate, when added to the above-specified dissolver solutions, removes over 97% of both the zirconium and the fluorine in the form of a precipitate. The precipitate is crystalline and can be separated easily by filtration. Formic acid, paraformaldehyde or a mixture of the two do not bring about a quantitative precipitation of zirconium. These findings have been utilized in the process of this invention.

The process of this invention comprises adding to a solution containing zirconium and fluoride ions, sodium formate, whereby a practically quantitative precipitation of zirconium and fluoride ions is accomplished, and separating the precipitate formed from the solution.

The applicant does not know the nature of the reaction taking place in the process of this invention, and he does not know the composition of the precipitate formed therein. The applicant determined, however, that at least two moles of sodium formate are necessary for each mole of zirconium for the treatment of dissolver solutions in which the mole ratio of $F^-$:$Zr$ is usually about five. Under these conditions the precipitation of zirconium was at least 97%.

The sodium formate should be added in the form of an aqueous solution, e.g. of a concentration of between 3 and 8 M. As has been mentioned before, precipitation can be effected at room temperature, which is at about 25° C.; the precipitation then is complete within five minutes. However, operation at elevated temperature, for instance at about 60° C., is also satisfactory.

In applying the process of this invention to the treatment of uranium-zirconium alloy fuel elements, the latter are first dissolved in hydrofluoric acid; this is a step known to those skilled in the art. Thereafter the uranium is preferably oxidized to the hexavalent state, because uranyl ions do not precipitate to any substantial degree; the losses of uranium by coprecipitation in that case average usually about 0.1%. The oxidation of uranium per se is not part of the invention, and the proper oxidizing agents are known to those skilled in the art; hydrogen peroxide and/or chromic acid are suitable.

Thereafter the sodium formate is added to the solution; a precipitate forms immediately. The precipitate is separated from the supernatant by conventional means, such as filtration, centrifugation or decantation, and subjected to one or several washing steps, preferably with a sodium nitrate solution, e.g. of a concentration of 0.1 M, to remove any adhering supernatant.

The supernatant can then be concentrated by evaporation to the uranium concentration and volume desired, namely to about 33 to 20% of the original volume. The solution is ready for uranium recovery, for instance by a liquid-liquid extraction process with trialkyl phosphate, such as tributyl phosphate, methyl isobutyl ketone or the like, after the acidity and salting strength have been adjusted to optimum concentrations. This part of the process, however, is known and not part of the invention.

In the following, two examples are given to illustrate the process of this invention.

Example I

Three runs were carried out. In each run 50 ml. of dissolver solution were used that was 1.6 M in zirconium and that contained 3.7 grams of uranium per liter. Chromic acid was added to each fraction of the dissolver solution to obtain a concentration of 0.03 M; the solutions were then heated to 60° C. Each dissolver solution was given a different hydrofluoric acid concentration by adding different portions of this acid. To the mixtures there were then added in each case 50 ml. of a solution containing 10.7 grams of sodium formate.

A precipitation occurred immediately, and after about five minutes the precipitates were filtered off and washed four times, each time with 25 ml. of 0.1 M sodium nitrate. The results of these three runs are compiled in the table.

| F to Zr mole ratio of dissolver solution | Precipitate composition | | Percent Zr loss to filtrate | Percent F loss to filtrate |
|---|---|---|---|---|
| | F to Zr mole ratio | Na to Zr mole ratio | | |
| 5.0 | 5.0 | 1.5 | 2.7 | <3.0 |
| 5.5 | 5.2 | 2.1 | 5.4 | 5.8 |
| 6.0 | 5.7 | 2.4 | 6.9 | 9.0 |

The uranium losses to the precipitates in the three runs averaged 2.4% after one wash, but were only 0.2% after the four washes.

Example II

A fuel composition consisting of 1.9 kg. of uranium, 93 kg. of zirconium and 1.4 kg. of tin is dissolved in 638 liters of an aqueous solution 8 M in hydrofluoric acid, 0.1 M in hydrogen peroxide and 0.03 M in chromic acid. The dissolver solution obtained, which has a volume of 638 liters, contains 3.0 grams of uranium per liter and is 1.6 M in zirconium, 0.02 M in tin, 1.6 M in acidity, 8.0 M in fluoride anions, less than 0.005 M in hydrogen peroxide and 0.03 M in chromic acid. To this solution there is then added sodium formate in an amount to yield a concentration of 3.2 M, which corresponds to 2 moles of sodium formate per mole of zirconium. The precipitation is carried out at room temperature. The precipitate is separated from the supernatant by filtration and washed with 1276 liters of 0.1 M aqueous sodium nitrate. The washed precipitate has a uranium content of 1.9 grams, a zirconium content of 1005 moles and a fluoride content of 5025 moles. The precipitation of both zirconium and fluoride corresponds to a removal of about 98.5%.

It will be understood that the invention is not to be limited to the details given herein but that it may be modified within the scope of the appended claims.

What is claimed is:

1. A process of removing zirconium and fluoride ions from an aqueous hydrofluoric acid solution of zirconium fluoride and hexavalent uranium in which the mole ratio of $F^-:Zr$ is at least five, said process comprising adding an aqueous solution of sodium formate to said solution in a quantity to have at least two moles of sodium formate present for each mole of zirconium whereby the zirconium and fluoride ions are precipitated along with the sodium while uranium remains in solution, and separating the precipitate from the solution.

2. The process of claim 1 wherein the solution contains an oxidizing agent for maintaining uranium in the hexavalent state.

3. The process of claim 2 wherein the oxidizing agent is hydrogen peroxide.

4. The process of claim 2 wherein the oxidizing agent is chromic acid.

5. The process of claim 1 wherein the formate solution has a concentration of between 3 and 8 M.

6. The process of claim 1 wherein precipitation is carried out at a temperature between 20 and 60° C.

7. The process of claim 1 wherein the precipitate is washed with an aqueous solution containing sodium nitrate.

References Cited in the file of this patent

UNITED STATES PATENTS 2,820,692     Shor _____ Jan. 21, 1958

OTHER REFERENCES

Blumenthal: "Chemical Behavior of Zirconium," pp. 314–317 (1958).

Adams et al.: "Ind. and Eng. Chem.," vol. 52, No. 1, pp. 55, 56, January 1960.

AEC Document IDO–14522, pp. 11–48, December 15, 1960.

Reactor Handbook, 2nd Edition, vol. II, pp. 55–60, 80, 81 (1961).